March 15, 1966     R. C. OSER     3,240,485
WORKPIECE POSITIONING DEVICES AND SYSTEMS
Filed Jan. 14, 1963
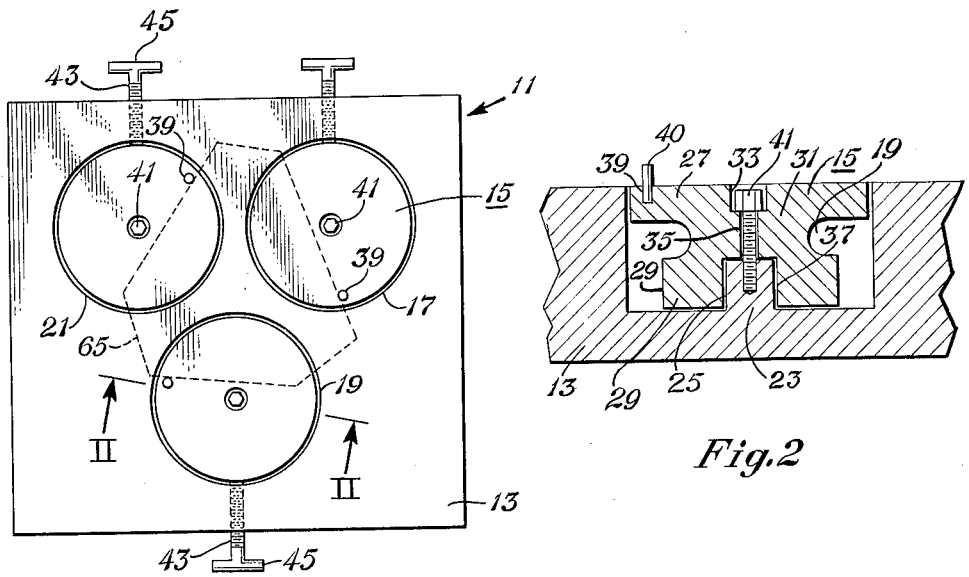
Fig. 1
Fig. 2
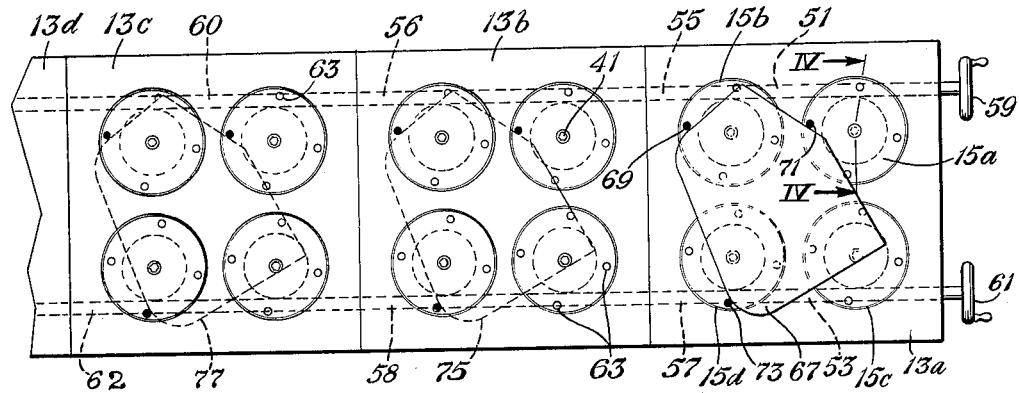
Fig. 3
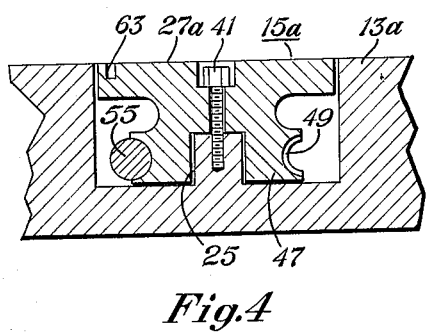
Fig. 4
INVENTOR.
Raymond C. Oser
BY Wm. T. Wofford
Attorney

United States Patent Office 3,240,485
Patented Mar. 15, 1966

3,240,485
WORKPIECE POSITIONING DEVICES AND
SYSTEMS
Raymond C. Oser, 1513 Woodlawn St., Fort Worth, Tex.
Filed Jan. 14, 1963, Ser. No. 251,300
6 Claims. (Cl. 269—305)

My invention relates to workpiece positioning devices and systems and more particularly to devices for positioning a workpiece or workpieces in any desired planar orientation.

It is oftentimes desirable and frequently it is necessary to be able to set up a workpiece or a plurality of identical workpieces in such a manner that a number of machine operations may be performed upon the workpiece or workpieces.

Usually it is necessary to carry out the operations sequentially in accordance with a predetermined program or machine loading schedule. Such operations may be performed one at a time upon a single workpiece selected from a group, or simultaneously upon groups of workpieces. In either case it is important to be able to locate and orient the workpiece or workpieces in a desired manner. And thus too, when the operations of a sequence have been concluded it is desirable to be a ble to readily and easily remove the workpiece or workpieces and set up other identical workpieces in precise conformity to the orientation of the workpiece or workpiece group immediately preceding.

Heretofore one of the commonest method for setting up a workpiece is to design and then fabricate for each different workpiece a special work-holding fixture, commonly termed a jig. Such a fixture or jig, of course, is useful for holding a workpiece of only one size and shape. It s neither practical nor advisable, generally, to attempt to adapt one jig to suit another workpiece of different size and shape. Consequently, it is necessary to provide a special jig for each different workpiece.

The necessity for making a separate jig for each different workpiece has several inherent disadvantages. Firstly, the unit fixture cost is generally high and therefore the unit workpiece cost is high. It is recognized that this is true and quite significant when the number of workpieces of one size and shape is small. Secondly, when there are only a few workpieces of a size and shape, the time to complete a unitary sequence of operations is much greater due to the time to make a jig for them. Lastly, the making of special fixtures or jigs creates an additional work load on other machines that may be used to make them.

In the prior art of which I am aware there has not been available a satisfactory work positioning device or system that is universally applicable to workpieces of many different shapes and sizes.

Accordingly, it is the general object of the present invention to provide an improved work positioning device and system which is capable of effectively positioning different workpieces.

Another object of the invention is to provide a work positioning device that is readily adjustable to suit workpieces of many different sizes and shapes.

Another object of the invention is to provide a workpiece positioning device that is readily adjustable to orient a workpiece in any desired planar or x–y axis direction, Another object of the invention is to provide a workpiece positioning device that will simplify the operations and reduce set up time.

A further object of the invention is to provide an effective workpiece positioning system wherein a plurality of workpiece positioning devices may be operated simultaneously and correlatively.

More particularly, in accordance with the present invention, there is provided a workpiece positioning device comprising a support structure and a plurality of workpiece locator elements. Each workpiece locator element is rotatably mounted on the support structure and has a workpiece engaging protuberance disposed in spaced relation to the locator element axis of rotation. The protuberance may be permanently fixed to the locator element, but is preferably easily removable, and preferably may be mounted at different positions on the locator element. The locator elements are preferably disposed with their axes of rotation mutually parallel and preferably with each axis located at the juncture of a respective pair of adjacent sides of a regular polygon. For some applications it is possible to utilize only two rotatable locator elements, with a fixed protuberance substituted for a third locator element. It is preferable, however, that a group of three or more locator elements may be used for each workpiece station. Three or four locator elements per workpiece station are preferred for most applications. Suitable restraining means are provided to restrain each locator element against rotation in any selected position.

In some applications it is desirable to utilize a plurality of workpiece stations, with a group of locator elements at each station, and with means for accomplishing correlative movement and orientation of the group. Stated another way, when the locator elements of one group are oriented in a selected manner, correlative drive means accomplishes a like orientation of the other groups.

For a further understanding of the invention and for further objects, features and advantages thereof, reference may now be made to the following description taken in conjunction with the accompanying drawing in which:

FIG. 1 is a schematic plan view of a workpiece positioning device in accordance with a preferred embodiment of the invention;

FIG. 2 is a sectional view taken at line II—II of FIG. 1;

FIG. 3 is a schematic plan view of another embodiment of the invention wherein a plurality of workpiece positioning devices are arranged for correlative orientation; and FIG. 4 is a sectional view taken at line IV—IV of FIG. 3.

Referring to FIG. 1, a workpiece positioning and holding device 11 (hereinafter sometimes referred to as positioning device) has a body or table 13 and a plurality of workpiece locator elements in the form of rotatable rings 15 recessed therein.

The table 13, as shown in FIG. 1, is a plate or slab of steel having a generally square shape in which there are three recesses 17, 19, 21, centered at the apexes of an equilateral triangle. The diameter of each recess is slightly larger than the diameter of the ring 15 recessed therein. The depth of each recess, in a preferred embodiment of my invention, is about two-thirds the thickness of the table 13. However, these relative proportions may be varied to suit particular circumstances or special conditions. The bottom of each recess is provided with a central cylindrical spindle 23, which forms a journal support for the ring 15. The spindle may be simply a hardened steel shaft or an ordinary steel shaft to which a coating of suitable bearing material has been applied to form a bearing 25.

The ring, as shown in FIG. 2, comprises a cylindrical top plate 27, a lower cylindrical hub 29 and a middle concavo-cylindrical portion 31 integrally connected to both the top plate 27 and the hub 29. The diameter of the top plate 27 is slightly less than the diameter of the respective recess 17, 19, 21 and the diameter of the hub 29 is somewhat less than the diameter of the top plate 27. The top plate 27 is provided with a center bore 33 and a reentrant center bore 35 of smaller diameter which extends through the concavo-cylindrical portion 31. The hub 29 is provided with a central recess 37 connecting with the reentrant bore 35. The diameter and length of the recess 37 are substantially equal to the diameter and length of the spindle-bearing 25. A hole 39 is provided in the top plate 27, preferably adjacent the periphery thereof. The hole 39 receives snugly a pin 40 or other protuberance which projects any convenient distance above the top of the plate 27.

The ring 15 is so mounted on the spindle-bearing 25 that the top surface thereof is flush with the top surface of the table 13. It will be recognized that in some applications the top of the ring 15 may be above the table 13 or slightly below. In any case, a center tie-down bolt 41 freely extends through the center bore 35 and threadedly engages a hole in the top of the spindle 23. Thus, by simply tightening the bolt 41, the ring may be caused to engage the top of the spindle-bearing and be restrained frictionally from rotation thereupon.

A thumb screw 43 having a T-head 45 threadedly engages a suitable bore extending from the outer surface of the table 13 radially into each recess 17, 19, 21. When extended inward, the thumb screw engages the outer periphery of the hub 29, thereby frictionally restraining the ring and maintaining the pin 40 in a selected orientation. Of course, any other suitable restraining or locking device may be used if desired.

FIGS. 3 and 4 illustrate a modification of the work positioning and holding device 11 illustrated in FIG. 1 and described hereinbefore. A plurality of modified work positioning devices 13a, 13b, 13c and 13d have their tables disposed in relatively fixed serially abutting relation. The tables of FIG. 3 each have four recesses, each similar to recesses 17, 19, 21 of FIG. 1. The four recesses are arranged in the form of a square and a ring such as 15a is supported centrally on a bearing 25 in each recess. Each ring 15a has a top plate and a concavo-cylindrical portion, which are similar to the top plate 27 and concavo-cylindrical portion 31 of FIG. 2, and a hub 47. The hub 47 of ring 15a has a plurality of worm gear teeth 49 forming a work gear on its outer surface. A pair of spaced parallel bores 51, 53 having axes lying in a plane generally perpendicular to the axis of the ring 15a, extend through the table and between a pair of parallel sides. The bores 51, 53 are so spaced apart that a worm shaft 55, 57 journaled in each bore engages the worm gears 49 of an opposed adjacent pair of rings 15a, 15b and 15c, 15d. Each worm shaft 55, 57 is provided at one end with a handwheel 59, 61 for operational purposes. Of course, any other suitable device may be used to manipulate the shafts 55, 57. The worm shafts 55, 57 are coupled (by suitable conventional means, not shown) to respective shafts 56, 58 of device 13b which are likewise coupled to respective shafts 60, 62 of device 13c, etc. It is of course understood that the tables and shafts of devices 13a, 13b, 13c, 13d could be made integral, or if desired, the tables may be separated and the shafts coupled by any suitable means.

Each of the top plates 27a of FIG. 3 has a plurality of holes 63 adjacent its periphery. The holes 63 in each top plate are disposed, preferably, on the arc of a circle concentric with the top plate 27a.

To understand the manner in which the positioning device 11 is used, reference is made to FIG. 1. With the thumb screws 43 and the bolts 41 in a retracted or disengaging position, each ring 15 is freely rotatable on its respective spindle-bearing 25. A unit workpiece 65, which for purposes of illustration only has the form of a six-sided polygon, is placed on the table 13. It will be recognized that the workpiece 65 may have any size and form. The workpiece 65 may be disposed in any selected orientation, but it is generally desirable to place it on the table 13 so that it will overlie a portion of all of the rings 15. Thereafter, each ring 15 is successively rotated until its respective pin 40 abuts the side of the workpiece 65, whereupon the thumb screws 43 and the bolts 41, if such be accessible, are tightened. The workpiece 65 is now restrained by the three pins 40 in a fixed lateral position and in a selected orientation. The workpiece 65 may now be secured to the surface of the table 13 in any suitable manner, using devices well known in the art such as a vise, T-bolts and clamps, hydraulic or air jacks and the like. In some applications, it may be feasible to employ threaded bolts instead of pins as, for example, whenever the hole pattern of a particular workpiece coincides with the locus of the hole in the table 13. In order that the hole 39 may be adaptable to receive either a pin or a bolt, the hole 39 may be made larger and threaded to receive a bolt. Thereafter, when it is desired to use a pin 40, an externally threaded bushing (not shown) may be screwed into the enlarged hole and the pin 40 inserted into the bushing.

During the course of a sequence of operations, a workpiece must remain in a fixed selected orientation on the table. But, when the operations are concluded on that workpiece and it is desired to repeat the sequence of operations on another workpiece, it should be possible to remove and replace workpieces with all reasonable dispatch. It will be recognized that in using the device of my invention, it is only necessary to release and transfer the hold-down device away from the workpiece. Whereupon, the finished workpiece may be expeditiously removed from the table and a like workpiece placed thereupon in the same oriented location. The same clamping or hold-down device may then be applied to it and tightened. The removal and replacement can be accomplished with a minimum of loss of time.

Moreover, it is readily apparent that the rotationally restrained rings of my work positioning device 11 may be readily released to quickly and expeditiously accommodate a workpiece of different size and shape. It is necessary only to loosen the thumb screws 43 and tie-down bolts 41 and thereafter the rings may be freely rotated to bring the pins 39 into abutting relation with the periphery of the different workpiece. Thereafter, the thumb screws 43 and the tie-down bolts of the rings may be tightened and a suitable hold-down device applied as before.

In some situations it is desirable to set up a plurality of like workpieces and to orient them in such a manner that operations may be performed simultaneously on all of them. One arrangement to accomplish this is to use a master or control workpiece positioning device and one or more slave workpiece positioning devices. FIG. 3 illustrates the principles of my invention applied to a master and slave positioning device arrangement. The device 13b, for example, is operatively responsive to the master device 13a since the worm shafts 56, 58 of device 13b are positively connected to the respective worm shafts 55, 57 of the master device 13a. Thus, by manipulating the handwheels 59, 61 of the master device 13a the respective rings of the connected slave devices operate responsively in synchronism and correlation to the movement of the rings of the master device 13a.

In operation, a workpiece 67 is placed and oriented as desired upon the master device 13a. The workpiece 67 may be a finished workpiece or ipso facto a template. Removable pins 69, 71 are inserted in accessible holes 63 of the rings 15a, 15b and the hand wheel 59 is manipulated to bring the pins 69, 71 into abutting relation with the contour of the workpiece 67. Another pin 73 is inserted into one of the accessible holes 63 in either ring 15c or 15d and the handwheel 61 is rotated until the pin 73 abuts the periphery of the workpiece 67. It is evident now that the workpiece 67 is restrained laterally between the pins 69, 71, 73, but is not fixed to the surface of the table of the device 13a. It may be so fixed by any suitable hold-down device, some of which are mentioned hereinbefore.

After locating and fixing the workpiece 67 to the table of the master device 13a, it is clear that a plurality of workpieces 75, 77, like the workpiece 67, may be placed on the respective slave device 13b, 13c in abutting relation to a group of pins similarly arranged as pins 69, 71, 73. The workpieces 75, 77 of course may be fixed to the surfaces of the tables of respective slave devices 13b, 13c by using suitable hold-down devices.

After the operations on the workpieces have been finished, they may be simply and expeditiously removed. It was mentioned hereinbefore, that it is only necessary to release and transfer the hold-down device from each workpiece; remove the workpieces from the tables; place other workpieces upon the tables in abutting relation to the pins; and transfer and reapply the hold-down devices. It will be appreciated by those skilled in the art that under normal circumstances there is sufficient frictional contact between the work shaft and gears to maintain the rings in fixed orientation during the removal and replacement of workpieces. However, in some applications, restraining devices such as the T-headed bolts 43 of FIG. 1, or other suitable devices, may be employed to fix and maintain the rings in a selected orientation.

It is readily apparent, now, that the principles of my invention may be incorporated in the bed portion of many types of machine tools, such as planers, shapers, milling machines, including those of the template tracing and tape programmed types, boring mills and like tools. Of course, portable or movable tables such as are illustrated and described herein may be used in association with any or all of the types of machine tools mentioned.

Whenever it is required that a workpiece be fixed and maintained within close tolerances, it is a simple matter to make such adjustments as are necessary with my invention. The restraining mechanism is released and the ring or rings moved by hand or by the respective handwheel, within the limit of the tolerance of the fit of the worm shaft and gears. The bolt 41 may then be retightened.

Indicia scales may be utilized to obtain desired planar or x–y axis orientation.

It will be appreciated by those skilled in the art that a plurality of rings may be arranged in any suitable manner in each table. It is evident that they may be so arranged that they may be driven either independently by a worm and shaft, or alternately if desired, or in practically any combination of arrangements. In any event, it is clear that the workpiece locator elements of the master device should be suitably mechanically linked to the corresponding locator elements of the slave devices in order to maintain correlative movement of the respective workpiece locator elements.

It is clear from the foregoing description that I have provided a universal-type workpiece positioning device; that the devices of my invention embody significant improvements over prior art workpiece positioning devices; that they are easily adjustable to suit workpieces of different sizes and shapes; that they are adjustable to orient a workpiece in any selected planar position; that they simplify and significantly reduce job set up time; and that they may be effectively utilized in correlative groups.

The foregoing disclosure and the showings made in the drawing are merely illustrative of the principles of this invention and are not to be interpreted in a limiting sense.

I claim:

1. A workpiece positioning system comprising a plurality of workpiece positioning devices, with each said device including: a support structure; a plurality of workpiece locator elements; means rotatably mounting said elements on said support structure with their axes of rotation in fixed spaced mutually parallel relation; a protuberance disposed on each said element in spaced relation to the element axis of rotation, with said protuberances being movable into abutting relation to a workpiece disposed between same by rotation of said elements; and means linking similarly disposed workpiece locator elements of said workpiece locator devices for correlative movement.

2. A workpiece positioning system comprising a plurality of workpiece positioning devices, with each said device including: a support structure; a plurality of workpiece locator elements; means rotatably mounting said elements on said support structure with their axes of rotation in spaced mutually parallel relation; a protuberance disposed on each said element in spaced relation to the element axis of rotation, with said protuberances being movable into abutting relation to a workpiece disposed between same by rotation of said elements; means for restraining said elements against rotational movement; and means linking similarly disposed workpiece locator elements of said workpiece positioning devices for correlative movement.

3. A workpiece positioning system comprising a plurality of workpiece positioning devices, with each said device including: a support structure; a plurality of workpiece locator elements; means rotatably mounting said elements on said support structure with their axes of rotation in spaced mutually parallel relation and with each said axis located at the juncture of a respective pair of adjacent sides of a regular polygon; a protuberance disposed on each said element in spaced relation to the element axis of rotation, with said protuberances being movable into abutting relation to a workpiece disposed between same by rotation of said elements; means for restraining said elements against rotational movement; and means linking similarly disposed workpiece locator elements of said workpiece positioning devices for correlative movement.

4. A system of workpiece supporting devices which comprises: a plurality of similar bodies disposed in juxtaposed relation; a plurality of rotatable rings similarly mounted in each said body, each said ring having therein at least one pin-receiving hole displaced from the ring axis of rotation; a pin disposed in and projecting from at least one said hole of each of said rings; means linking similarly disposed rings of said bodies for rotating same synchronously to urge said pins into abutting relation with respective workpieces.

5. A system of workpiece supporting devices which comprises: a plurality of similar bodies disposed in juxtaposed relation; a plurality of rotatable rings similarly mounted in each said body, each said ring having therein at least one pin-receiving hole displaced from the ring axis of rotation; a pin disposed in and projecting from at least one said hole of each of said rings; a worm gear formed on the outer periphery of each said ring; a respective worm shaft engaging the worm gears of respective similarly disposed rings for synchronously rotating same to urge said pins into abutting relation with respective workpieces.

6. A system of workpiece supporting devices which comprises: a plurality of bodies disposed in juxtaposed relation with each body having therein a plurality of recesses; a plurality of rings each being mounted in one said recess for rotation about an axis, each said ring having therein a plurality of pin-receiving holes displaced from said axis; a pin disposed in at least one hole of each said ring; a worm gear formed on the outer periphery of each said ring; a respective worm shaft engaging the worm gear of respective similarly disposed rings for synchronously rotating same to urge said pins into abutting relation with respective workpieces.

References Cited by the Examiner

UNITED STATES PATENTS

| | | | |
|---|---|---|---|
| 6,681 | 8/1849 | Martin et al. | 279—35 X |
| 23,472 | 4/1859 | Johnson | 279—35 |
| 1,685,899 | 10/1928 | Andrew | 279—123 |
| 2,421,957 | 6/1947 | Mead | 269—297 X |
| 2,456,039 | 12/1948 | Abramson | 248—23 |

ROBERT C. RIORDON, *Primary Examiner.*

F. J. POWERS, *Assistant Examiner.*